(12) United States Patent
Hwang

(10) Patent No.: US 10,334,632 B2
(45) Date of Patent: Jun. 25, 2019

(54) RANDOM ACCESS METHOD AND DEVICE

(71) Applicant: Electronics and Telecommunications Research Institute, Daejeon (KR)

(72) Inventor: Hyun-Yong Hwang, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 183 days.

(21) Appl. No.: 15/191,138

(22) Filed: Jun. 23, 2016

(65) Prior Publication Data

US 2016/0381713 A1    Dec. 29, 2016

(30) Foreign Application Priority Data

Jun. 24, 2015  (KR) .................. 10-2015-0089734
Jun. 24, 2015  (KR) .................. 10-2015-0089735
Jul. 14, 2015  (KR) .................. 10-2015-0099723
Jun. 14, 2016  (KR) .................. 10-2016-0074051
Jun. 14, 2016  (KR) .................. 10-2016-0074052
Jun. 14, 2016  (KR) .................. 10-2016-0074057

(51) Int. Cl.
*H04W 74/08*    (2009.01)

(52) U.S. Cl.
CPC .................. *H04W 74/0833* (2013.01)

(58) Field of Classification Search
CPC ................................................ H04W 74/0833
See application file for complete search history.

(56) References Cited

U.S. PATENT DOCUMENTS

| | | |
|---|---|---|
| 7,599,306 B2 | 10/2009 | Park et al. |
| 7,792,075 B2 | 9/2010 | Chin et al. |
| 8,305,982 B2 * | 11/2012 | Zhang .................. H04L 1/1692 370/329 |
| 8,570,863 B2 | 10/2013 | Lee |
| 8,797,989 B2 | 8/2014 | Lee |
| 8,908,619 B2 | 12/2014 | Lee et al. |
| 2004/0185785 A1 * | 9/2004 | Mir ....................... H04L 1/0014 455/67.11 |
| 2008/0205433 A1 * | 8/2008 | Pihlaja ............... H04W 74/004 370/461 |

(Continued)

FOREIGN PATENT DOCUMENTS

| | | |
|---|---|---|
| EP | 2680656 A1 | 1/2014 |
| KR | 100197491 B1 | 2/1999 |

(Continued)

OTHER PUBLICATIONS

"3rd Generation Partnership Project; Technical Specification Group Radio Access Network; Study on RAN Improvements for Machine-type Communications; (Release 11)," 3GPP TR 37.868 V11.0.0, Sep. 2011, pp. 1-28, 3GPP Organizational Partners.

(Continued)

*Primary Examiner* — Asad M Nawaz
*Assistant Examiner* — Saad A. Waqas
(74) *Attorney, Agent, or Firm* — William Park & Associates Ltd.

(57) ABSTRACT

Disclosed is a random access method and device. A terminal generates a random number for a random access, and compares the random number and a setting value. When the random number is included in the setting value, the terminal transmits a preamble for a random access to a base station and attempts a random access.

19 Claims, 12 Drawing Sheets

(56) References Cited

U.S. PATENT DOCUMENTS

| | | | |
|---|---|---|---|
| 2011/0274040 A1 | 11/2011 | Pani et al. | |
| 2012/0165058 A1 | 6/2012 | Hwang et al. | |
| 2014/0064190 A1 | 3/2014 | Lee | |
| 2014/0133475 A1 | 5/2014 | Hong et al. | |
| 2016/0323915 A1* | 11/2016 | Liu | H04W 16/14 |
| 2017/0280482 A1* | 9/2017 | Chatterjee | H04W 8/005 |

FOREIGN PATENT DOCUMENTS

| | | |
|---|---|---|
| KR | 100884380 B1 | 2/2009 |
| KR | 101414696 B1 | 7/2014 |
| KR | 101469427 B1 | 12/2014 |

OTHER PUBLICATIONS

Access Time Distribution Scheme, Jun. 25, 2015.
Prioritized RACH Preamble Allocation Scheme, Jun. 25, 2015.
Dynamic RACH Preamble Allocation Scheme, Jun. 25, 2015.

* cited by examiner

RANDOM ACCESS METHOD AND DEVICE

CROSS-REFERENCE TO RELATED APPLICATION

This application claims priority to and the benefit of Korean Patent Application Nos. 10-2015-0089734, 10-2015-0089735, 10-2015-0099723, 10-2016-0074051, 10-2016-0074052, and 10-2016-0074057 filed in the Korean Intellectual Property Office on Jun. 24, 2015, Jun. 24, 2015, Jul. 14, 2015, Jun. 14, 2016, Jun. 14, 2016, and Jun. 14, 2016, the entire contents of which are incorporated herein by reference.

BACKGROUND OF THE INVENTION (a) Field of the Invention

The present invention relates to a random access method and device in a mobile communication network.

(b) Description of the Related Art

Machine-to-machine (M2M) communication may be defined to be ubiquitous communication between machines so as to perform various operations such as sensing, processing, decision making, or acting on decisions. The biggest difference between the M2M communication and human-to-human (H2H) communication is a reduction in management of persons in a communication lifecycle.

However, new applications are generated among different types using the M2M technology because of gradually increasing automation, which has substantially increased the number of devices (terminals) to which the M2M technology is applied. The devices are used for various applications. Some devices are used in applications for an emergency situation thereby requiring a very high success probability and a very short access delay time. Some devices are used in applications for fixed scheduling thereby requiring somewhat high success probability and a relatively short access delay time. Some devices have a relatively low limitation compared to other applications so a low success probability and a long access time may be applied.

However, regarding a present mobile communication network, many devices share sixty-four random access channel (RACH) preambles and use the same irrespective of applications. Further, priority information may be provided to the devices in the network.

In addition, the management of massive connectivity (MC) for satisfying quality of service (QoS) requirements of various applications operable in the devices has become an important issue.

Therefore, when the number of devices simultaneously attempting to access the network is greater than an amount of available radio resources, an overload is generated and a failure probability of network access is increased so a method for solving this problem is required.

Further, the H2H devices require high access success probabilities and short access delay times. However, the M2M devices allow low access success probabilities and long access delay times depending on the applications. In the mobile communication network, the H2H devices share sixty-four RACH preambles to the maximum with the M2M devices. The number of M2M devices is greater than the number of H2H devices so the M2M devices deteriorate performance of the H2H devices.

Therefore, in a congested condition in which there are many devices (terminals) simultaneously attempting to access the network, a prerequisite method for dynamically controlling the random access attempt based on a network load, separating RACH resources of the H2H devices and RACH resources of the M2M devices, and maintaining performance of the H2H devices is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a random access method and device for preventing a collision in a mobile communication network. The present invention has been made in another effort to provide a random access method and device using an access time distributing scheme in a mobile communication network.

The present invention has been made in another effort to provide a random access method and device using preamble allocation according to a priority in a mobile communication network.

The present invention has been made in another effort to provide a random access method and device for using access class barring (ACB) information, dynamically allocating a preamble, and controlling a random access in a mobile communication network.

An exemplary embodiment of the present invention provides a random access method of a terminal in a mobile communication system, including: generating a random number for a random access; comparing the random number and a setting value; and transmitting a preamble for a random access to a base station when the random number is included in the setting value.

The setting value may be frame information transmitted from the base station, and the comparing may include comparing frame information transmitted from the base station and the generated random number. In this instance, the transmitting of a preamble to the base station may include transmitting a preamble for a random access to the base station when the frame information corresponds to the random number.

The generating of a random number may include using information uniquely allocated to a terminal as a seed value, and generating the random number by using the seed value. In this case, the seed value may include one of an international mobile subscriber identity (IMSI) allocated to a terminal, an international mobile equipment identity (IMEI) allocated to a terminal, and a mobile subscriber identification number (MSIN) allocated to a terminal, and the frame information may be a system frame number (SFN).

The generating of a random number may include generating a random number 1 for a random access, and generating a random number 2 for a random access. In this instance, the comparing of frame information and the generated random number may include comparing frame information 1 transmitted by the base station and the random number 1, and comparing frame information 2 transmitted by the base station and the random number 2 when the first frame information corresponds to the first random number. In this case, a preamble for a random access may be transmitted to the base station when the second frame information corresponds to the second random number.

The frame information 1 may be a system frame number (SFN 1), and the frame information 2 may be a sub-frame number (sfn 2). The first random number may be a random value included in a first range, the second random number may be a random value included in a second range, and the first range may be different from the second range. A minimum value and a maximum value of the first range may correspond to a minimum value and a maximum value of the SFN 1, respectively, and a minimum value and a maximum value of the second range may correspond to a minimum value and a maximum value of the sfn 2, respectively.

The method may further include, prior to the generating of a random number, setting the seed value. The setting of the seed value may include: setting the seed value based on one of a first method for setting a seed value when a terminal is registered, a second method for setting a seed value when a terminal is installed, and a third method for setting a seed value when a connection of a terminal is released; and assigning priorities to the first method, the second method, and the third method, and setting the seed value based on the corresponding method according to the priorities.

The setting value may be a range of available random access channel (RACH) preambles. In this case, the method may further include allowing the terminal to receive information broadcast by the base station, determining an access barring factor for determining whether to bar an access, and calculating a range of the available RACH preambles by using the access barring factor.

In this case, the generating of a random number may include generating a random number for the RACH preamble, and the comparing may include comparing to determine whether the random number is included in the range of available RACH preambles. The transmitting of a preamble to the base station may include transmitting a preamble for a random access to the base station when the random number is included in the range of available RACH preambles.

The acquiring of an access barring factor may further include allowing the terminal to receive information broadcast by the base station and acquire an access barring time. In this instance, the transmitting of a preamble to the base station may further include performing a standby based on the access barring time when the random number is not included in the range of available RACH preambles, and transmitting a preamble for a random access to the base station.

The terminal may belong to one access class, a value of the access barring factor may be changed for each access class, and a number of preambles belonging to the range of available RACH preambles may become different according to a value of the access barring factor.

Another embodiment of the present invention provides a random access method of a terminal in a mobile communication system, including: allowing the terminal to acquire information on a range of available random access channel (RACH) preambles; selecting one preamble from the information on a range of available RACH preambles; and transmitting the selected preamble to the base station, wherein the range of available RACH preambles becomes different according to a priority allocated to a group to which the terminal belongs.

A range and a number of the available RACH preambles may become different for respective groups according to the priority, a wider range of RACH preambles with a greater number of preambles may be allocated as the priority becomes higher, and a narrower range of RACH preambles with a lesser number of preambles may be allocated as the priority becomes lower.

The information on a range of available RACH preambles may include an access class bitmap corresponding to an access class to which the terminal belongs, rate information for indicating a rate occupied by a range of available RACH preambles usable by the terminal when attempting a random access in an entire range of RACH preambles, and group information to which the terminal belongs according to an access class. In this instance, the acquiring of information on the range of preambles may include calculating a range of available RACH preambles in the entire RACH range by using the rate information.

The information on the range of available RACH preambles may include an access class bitmap corresponding to an access class to which the terminal belongs, range information on a range of available RACH preambles usable when the terminal attempts a random access, and group information to which the terminal belongs according to the access class. The range information may be configured in a form of (a start RACH preamble, a RACH preamble length).

Yet another embodiment of the present invention provides a random access device in a mobile communication system, including: a radio frequency (RF) converter for transmitting/receiving signals through an antenna; and a processor connected to the RF converter and performing a random access, wherein the processor is configured to generate a random number for a random access, compare the random number and a setting value, and transmit a preamble for a random access to the base station when the random number is included in the setting value.

The setting value may represent frame information transmitted from the base station, and the processor may be configured to transmit a preamble for a random access to the base station when the frame information corresponds to the random number.

The processor may be configured to generate a random number 1 for a random access, generate a random number 2 for a random access, compare second frame information transmitted by the base station and the random number 2 when first frame information transmitted by the base station corresponds to the random number 1, and transmit a preamble for a random access to the base station when the second frame information corresponds to the random number 2.

The setting value may represent a range of available random access channel (RACH) preambles acquired by receiving information broadcast from the base station by the terminal, and calculated based on an access barring factor for determining whether to bar an access. In this instance, the processor may be configured to generate a random number for RACH preambles, and transmit a preamble for a random access to the base station when the random number is included in the range of available RACH preambles.

The processor is configured to additionally allow the terminal to receive information broadcast by the base station to acquire an access barring time, perform a standby based on the access barring time when the random number is not included in the range of available RACH preambles, and transmit a preamble for a random access to the base station.

DETAILED DESCRIPTION OF THE EMBODIMENTS

Figure 1:
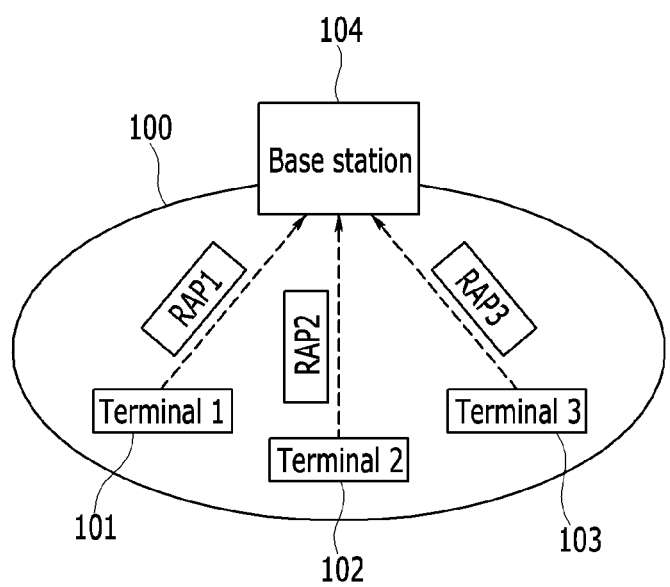
FIG. 1 shows a network environment in which a RACH preamble collision is generated.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Throughout the specification, a terminal may designate a device, a mobile terminal (MT), a mobile station (MS), an advanced mobile station (AMS), a high reliability mobile station (HR-MS), a subscriber station (SS), a portable subscriber station (PSS), an access terminal (AT), or user equipment (UE), and it may include entire or partial functions of the device, MT, MS, AMS, HR-MS, SS, PSS, AT, and UE.

Further, a base station (BS) may designate an advanced base station (ABS), a high reliability base station (HR-BS), a nodeB (node B), an evolved node B (eNodeB), an access point (AP), a radio access station (RAS), a base transceiver station (BTS), a mobile multihop relay (MMR)-BS, a relay station (RS) for functioning as the base station, a relay node (RN) for functioning as the base station, an advanced relay station (ARS) for functioning as the base station, a high reliability relay station (HR-RS) for functioning as the base station, or a small base station (such as a femto BS, a home node B (HNB), a home eNodeB (HeNB), a pico BS, a metro BS, or a micro BS), and it may include entire or partial functions of the ABS, nodeB, eNodeB, AP, RAS, BTS, MMR-BS, RS, RN, ARS, HR-RS, and small base station.

A random access method and device according to an exemplary embodiment of the present invention will now be described with reference to accompanying drawings.

In the case of a random access (RA) in the mobile communication system, the terminal initially uses four messages so as to access the network, and the four messages may be referred to as an access reservation protocol (ARP).

The first message is a preamble signal for the RA, and it may be referred to as a random access preamble (RAP) Msg1. One of sixty-four available exemplary RACH preambles configuring one radio resource for the RA is selected and is then transmitted to a base station. The second message is a RA response signal, and it may be referred to as a random access response (RAR) Msg2. When the base station receives the RAP, it responds with an RAR that corresponds to an RA resource including an RAP received time and a frequency to the terminal. In this instance, the base station transmits another ID which is also called a temporary cell radio network temporary identity (C-RNTI) that is a temporary cell identifier to the terminal. When the terminal may not be able to receive the RAR for a specific period of time after transmitting the RAP, it increases a count, performs power lamping, and again transmits the RAP.

The third message is a radio resource control (RRC) connection request Msg3, and the terminal transmits the RRC connection request message to the base station. In this instance, the terminal uses the temporary C-RNTI that is a temporary cell identifier allocated by the base station in the previous stage. The fourth message is an RRC connection setup Msg4, and the base station responds a contention resolution message to the terminal. This message includes a new cell identifier, that is, a C-RNTI.

As described, when the terminal accesses the network and at least two terminals simultaneously transmit the same RACH preamble (Msg1), a collision may occur. For example, when at least two terminals simultaneously transmit the same RACH preamble (Msg1), the base station transmits the RAR Msg2, and in this instance, it will transmit the same temporary C-RNTI and an uplink grant to the terminals attempting an access. The terminals transmit L2/L3 (Layer-2 and Layer-3) messages to the base station (Msg3) through same resource allocation. These messages transmitted through the same resource allocation work as interference with each other, and the base station may not decode the messages from the terminals. In this case, the terminals failing to receive a collision resolution message (Msg4) from the base station attempt an access again after a predetermined time.

FIG. 1 shows a network environment in which a RACH preamble collision is generated.

As shown in FIG. 1, a terminal 1 (101), a terminal 2 (102), a terminal 3 (103), and a base station 104 may be disposed in a network 100. In such a network environment, when the terminals 101, 102, and 103 in the network 100 simultaneously attempt to access the network 100, the respective terminals randomly select one of the up to sixty-four RACH preambles and transmit the same to the base station 104. For example, the terminal 1 (101) transmits the RACH preamble 1 (RAP1) to the base station 104, the terminal 2 (102) transmits the RACH preamble 2 (RAP2) to the base station 104, and the terminal 3 (103) transmits the RACH preamble 3 (RAP3) to the base station 104.

In this instance, when the RACH preambles RAP1, RAP2, and RAP3 transmitted by the terminals 101, 102, and 103 have a same value, a collision is generated. When the collision is generated, the base station 104 fails to decode the messages of the terminals, and the terminals 101, 102, and 103 must attempt the random access again. Up to sixty-four RACH preambles are used in the mobile communication network, so the greater the number of terminals simultaneously attempting the random access is, the higher the collision probability is.

In a first exemplary embodiment of the present invention, the collision probability of generating the random access is reduced by using the access time distributing scheme.

Figure 2:
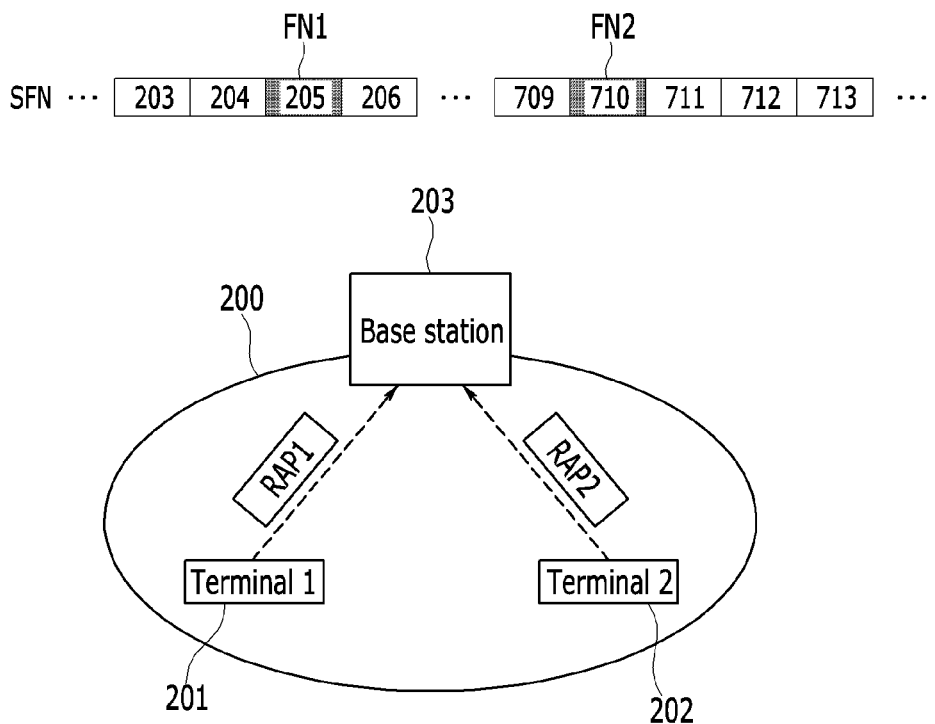
FIG. 2 shows a process for performing a random access using an access time distributing scheme according to a first example of a first exemplary embodiment of the present invention.

FIG. 2 shows a process for performing a random access using an access time distributing scheme according to a first example of a first exemplary embodiment of the present invention.

As shown in FIG. 2, a terminal 1 (201), a terminal 2 (202), and a base station 203 may be disposed in a network 200. When the terminals 201 and 202 desire to access the base station 203 in the network environment, the terminals 201 and 202 use an inner pseudo-random number generator to generate random numbers.

The pseudo-random number generator uses a seed value to generate the random number. The seed value is unique and different for each terminal. An international mobile subscriber identity (IMSI) assigned for each terminal may be used as the seed value. The IMSI includes a mobile country code (MCC), a mobile network code (MNC), and a mobile subscriber identification number (MSIN) so it is unique and does not correspond to the IMSI values allocated to other terminals.

In addition, a minimum value and a maximum value may be set for the random number. For example, 0, which is the minimum value of a system frame number (SFN), is applied as the minimum value of the random number generated by the pseudo-random number generator, and 1023, which is the maximum value of the SFN, is applied as the maximum value of the random number. Therefore, the random number generated by the pseudo-random number generator is a random value between 0 and 1023.

For example, assuming that the random number generated by the terminal 1 (201) is 205 and the random number generated by the terminal 2 (202) is 710, the terminals 201 and 202 monitor the SFN that is a frame index number of the wireless frame provided by the present base station 203, and transmit the RACH preamble when the SFN corresponds to the random number generated by the terminals 201 and 202. In detail, when the SFN becomes 205 (FN1), the present SFN corresponds to the random number generated by the terminal 1 (201), and the terminal 1 (201) transmits a message including a RACH preamble 1 (RAP1) to the base station 203. When a predetermined period of time passes and the SFN becomes 710 (FN2), the present SFN corresponds to the random number generated by the terminal 2 (202), so the terminal 2 (202) transmits a message including a RACH preamble 2 (RAP2) to the base station 203.

The timings for the terminal 1 (201) and the terminal 2 (202) to attempt a random access are the time FN1 when the SFN is 205 and the time FN2 when the SFN is 710, which are different from each other, so no collision occurs when they use the same RACH preamble.

Figure 3:
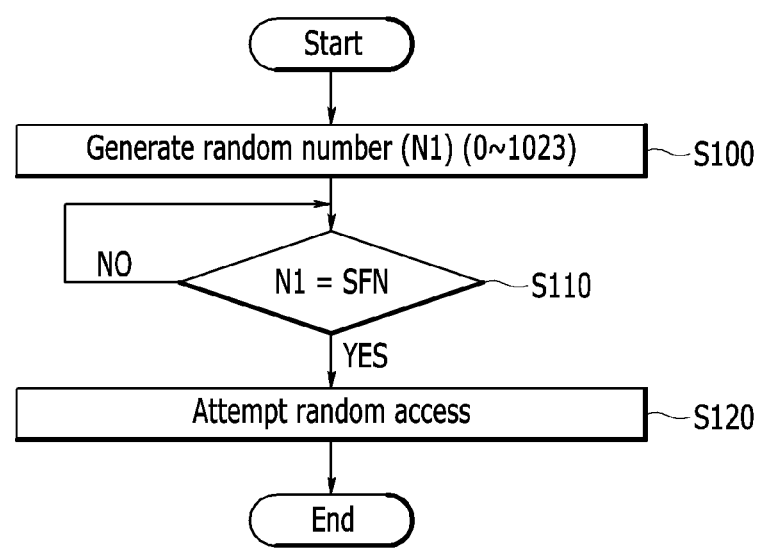
FIG. 3 shows a flowchart of a random access method according to a first example of a first exemplary embodiment of the present invention.

FIG. 3 shows a flowchart of a random access method according to a first example of a first exemplary embodiment of the present invention.

As shown in FIG. 3, a random access device uses a seed value to generate a random number included in a first range.

For example, the random access device uses an IMSI allocated to the terminal as the seed value to generate a random value of 0 to 1023 as the random number N1 (S100). The random access device monitors SFN information provided by the base station to compare the random number N1 generated in the previous stage S100 and the current SFN (S110).

The random access device 1 continuously monitors the SFN when the random number N1 does not correspond to the SFN, and it attempts a random access to the base station when they correspond to each other (S120).

Figure 4:
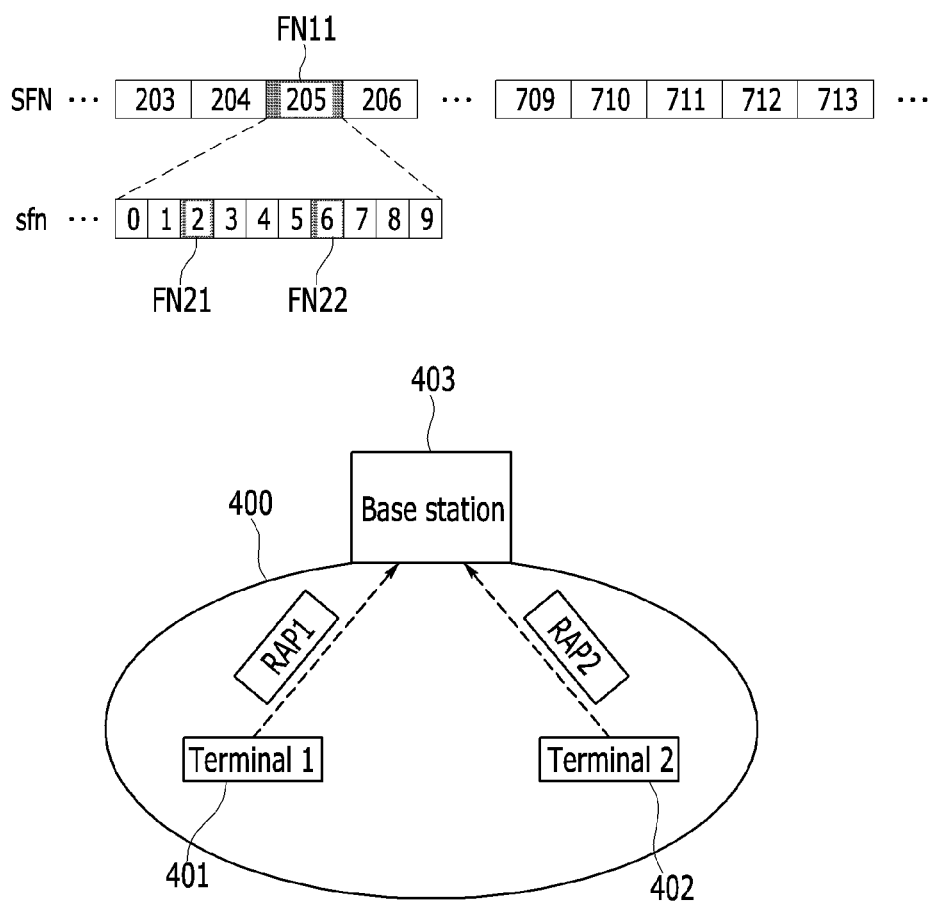
FIG. 4 shows a random access process using an access time distributing scheme according to a second example of a first exemplary embodiment of the present invention.

FIG. 4 shows a random access process using an access time distributing scheme according to a second example of a first exemplary embodiment of the present invention.

As shown in FIG. 4, a terminal 1 (401), a terminal 2 (402), and a base station 403 may be disposed in a network 400. In the network environment, when the terminals 401 and 402 in the network desire to access the base station 403, the terminals 401 and 402 use a pseudo-random number generator in the terminals to generate two random numbers.

The pseudo-random number generator uses a seed value to generate a random number, the seed value is unique for each terminal, and it may be an IMSI assigned for each terminal as described above.

Differing from the first example of the first exemplary embodiment, the pseudo-random number generator uses a seed value to generate two random numbers. The random number 1 is generated according to the first random number generation. For example, the minimum value of 0 and the maximum value of 1023 of the SFN may be applied as a minimum value and a maximum value of the random number 1. Therefore, the random number 1 generated by the pseudo-random number generator may be a random value between 0 and 1023. Further, the random number 2 is generated according to the second random number generation. For example, the minimum value of 0 and the maximum value of 9 of a sub-frame number (sfn) may be applied as a minimum value and a maximum value of the random number 2. Therefore, the random number 2 generated by the pseudo-random number generator may be a random value between 0 and 9. The random number 1 and the random number 2 have different minimum values and maximum values, as described above.

For example, in FIG. 4, assuming that the random number 1 generated by the terminal 1 (401) is 205, the random number 2 is 2, the random number 1 generated by the terminal 2 (402) is 205, and the random number 2 is 6, the terminals 401 and 402 monitor the SFN that is a frame index number of the wireless frame provided by the current base station 403. When the SFN becomes 205 (FN11), the current SFN corresponds to the first random number generated by the terminal 1 (401) and the terminal 2 (402), so the terminal 1 (401) and the terminal 2 (402) prepare for attempting a random access, and monitor the sfn. When the sfn becomes 2 (FN21) in the current frame, the current sfn corresponds to the random number 2 generated by the terminal 1 (401), so the terminal 1 (401) transmits a message including a RACH preamble 1 (RAP1) to the base station 403. When a predetermined period of time passes and the sfn becomes 6 (FN22), the current sfn corresponds to the random number 2 generated by the terminal 2 (402), so the terminal 2 (402) transmits a message including a RACH preamble 2 (RAP2) to the base station 403. The timings for the terminal 1 (401) and the terminal 2 (402) to attempt a random access are the time FN21 when the sfn is 2 and the time FN22 when the sfn is 6, which are different from each other, so no collision occurs when they use the same RACH preamble.

Figure 5:
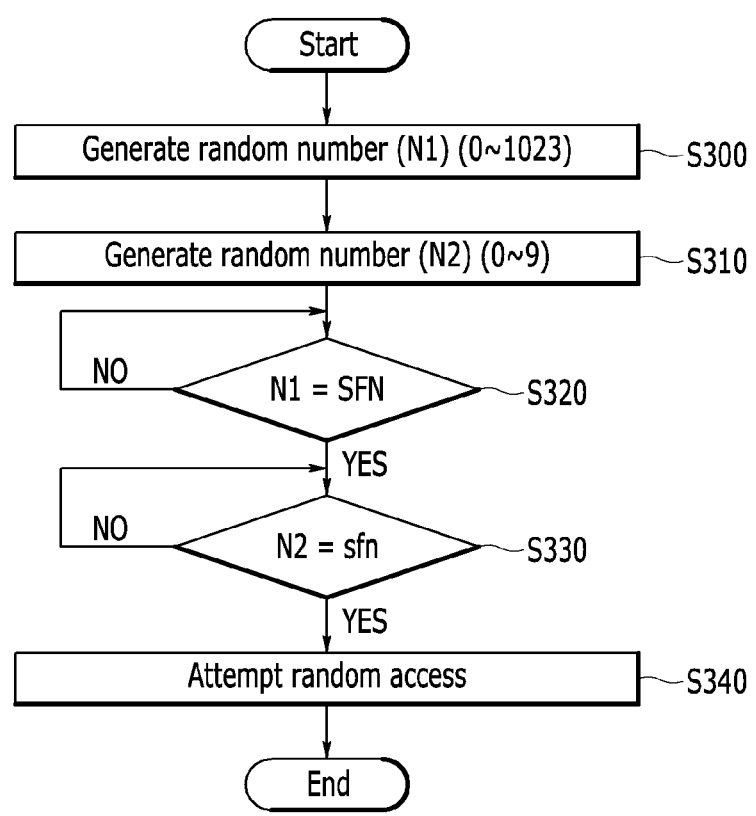
FIG. 5 shows a flowchart of a random access method according to a second example of a first exemplary embodiment of the present invention.

FIG. 5 shows a flowchart of a random access method according to a second example of a first exemplary embodiment of the present invention.

As shown in FIG. 5, a random access device uses a seed value to generate a plurality of random numbers. In detail, the random access device uses an IMSI allocated to the terminal as the seed value to generate a random value of 0 to 1023 as the first random number N1 (S300). Further, the random access device uses an IMSI allocated to the terminal as the seed value to generate a random value of 0 to 9 as the random number 2 (N2) (S310).

The random access device monitors SFN information provided by the current base station, and compares the random number 1 (N1) generated in the previous stage S300 and the SFN (S320). When the random number 1 (N1) does not correspond to the SFN, the random access device continuously monitors it, and when the first random number N1 corresponds to the SFN, the random access device monitors sfn information provided by the base station to compare the random number 2 (N2) generated in the previous stage S310 and the sfn (S330).

When the random number 2 (N2) does not correspond to the sfn, the random access device continuously monitors it, and when they correspond to each other, the random access device attempts a random access to the base station (S340).

In a first exemplary embodiment of the present invention, the seed value for generating the random number is unique for each terminal, and an international mobile equipment identity (IMEI) may be used as the seed value instead of the IMSI. The IMEI includes a type allocation code (TAC), a serial number (SNR), and a check digit (CD), so it is unique and does not correspond to the values allocated to other terminals.

Further, a mobile subscriber identification number (MSIN) may be used as the seed value instead of the IMSI. The MSIN is a unique value in a public land mobile network (PLMN), and does not correspond to the values allocated to other terminals.

To control the random access, the seed value may be set when the terminal is registered. In addition, the seed value may be set by a following method.

Method 1. A method for acquiring or setting a seed value when a terminal is installed.

Method 2. A method for acquiring or setting a seed value when a terminal connection is released.

The method for acquiring or setting a seed value when a terminal is installed represents a method for setting a seed value as an initial value in the terminal when the terminal is installed.

The method for acquiring or setting a seed value when a terminal connection is released represents a method for acquiring a seed value as an initial value to be used when the terminal is connected again from the base station when the connection of the terminal is released.

Priorities may be assigned to the above-described methods for setting a seed value (setting at the time of registration, setting at the time of installation, and setting at the time of connection release), and the seed value may be set by using the corresponding method according to the priorities. Further, the priorities applicable to the methods are modifiable depending on the cases, or they are operable by a selective combination method.

A random access will be performed using preamble allocation according to priorities in a second exemplary embodiment of the present invention.

Figure 6:
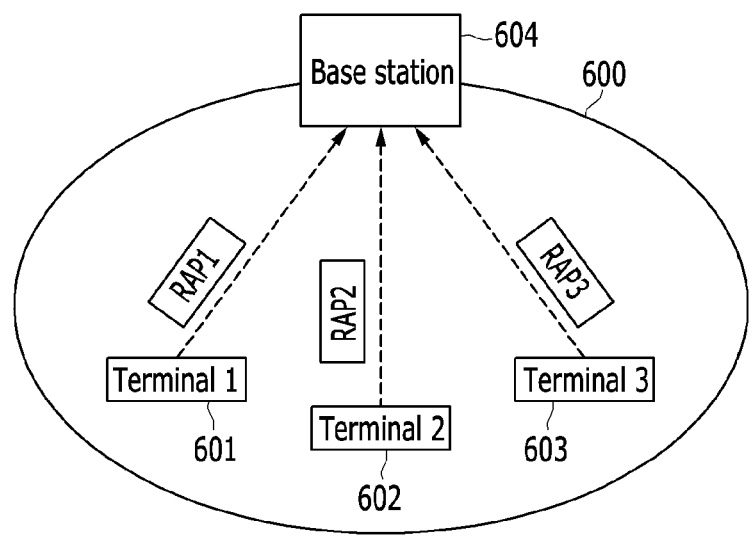
FIG. 6 shows a process for performing a random access according to preamble allocation based on a priority according to a first example of a second exemplary embodiment of the present invention.

FIG. 6 shows a process for performing a random access according to preamble allocation based on a priority according to a first example of a second exemplary embodiment of the present invention. Here, the preamble allocation will be performed by using a RACH preamble sharing allocation scheme.

As shown in FIG. 6, a terminal 1 (601), a terminal 2 (602), a terminal 3 (603), and a base station 604 may be disposed in a network 600. In the network environment, the terminals 601, 602, and 603 respectively have an access class (AC). For example, the access class (AC) may be divided into sixteen access classes. The terminals have one of the AC 0 to the AC 9. Further, the terminals may additionally have a special class between the AC 10 and the AC 15.

Here, the terminals 601, 602, and 603 have one of the AC 0 to the AC 9.

The base station 604 uses access class information to group the terminals and assign different priorities to the groups. The base station 604 differently allocates the range and the number of the RACH preambles available for respective groups according to the priorities. For example, the base station 604 allocates a wider RACH preamble range as the priority becomes higher, and it allocates a narrower RACH preamble range as the priority becomes lower. Accordingly, more RACH preambles are allocated as the priority becomes higher, and less RACH preambles are allocated as the priority becomes lower.

The base station 604 notifies the terminals 601, 602, and 603 of the network 600 of a corresponding group and priority related information. The group and priority related information of the terminals 601, 602, and 603 includes an access class bitmap I1, a rate I2, and a group I3.

The access class bitmap I1 has a range of 0 to 9. The access class bitmap I1 has a 10-bit length, a most significant bit (MSB) signifies "AC 0", and a least significant bit (LSB) represents "AC 9" (opposite settings are allowable depending on a setting standard). For example, when the access class bitmap I1 is "1111000000", it signifies that the terminals with the AC that corresponds to the range of 0 to 3 belong to the group 0. Further, when the access class bitmap I1 is "0000111100", it signifies that the terminals with the AC that corresponds to the range of 4 to 7 belong to the group 1. Further, when the access class bitmap I1 is "0000000011", it signifies that the terminals with the AC that corresponds to the range of 8 to 9 belong to the group 2.

The rate I2 indicates an available range of the RACH preamble when the terminal attempts a random access. In detail, the rate I2 represents a percentage occupied by the RACH preamble available in the entire RACH preamble, and it exemplarily has a value of 0 to 100. For example, when the rate I2 is "10", it signifies that 10% of the sixty-four RACH preambles are usable and the RACH preambles may be generated within the range of 0 to 5 (the total of 6). Further, when the rate I2 is "50", it signifies that 50% of the sixty-four RACH preambles are usable and the RACH preambles may be generated within the range of 0 to 31 (the total of 32). Further, when the rate I2 is "100", it signifies that 100% of the sixty-four RACH preambles are usable and the RACH preambles may be generated within the range of 0 to 63 (the total of 64).

The group I3 represents a group according to the access class.

The group and priority related information including the access class bitmap I1, the rate I2, and the group I3 may be broadcast using a system information block (SIB).

The terminals 601, 602, and 603 in the network 600 have one access class (AC), so they may know the group to which they belong and the range and the number of available RACH preambles allocated to the group based on the group and priority related information provided by the base station 604. That is, they may know information on the rate I2 of the group to which they belong from the information provided through the SIB. For example, as shown in FIG. 6, when the access class (AC) of the terminal 1 (601) is 3, the access class bitmap I1 transmitted by the base station 604 is "1111000000", and the terminal 1 (601) recognizes that the terminal 1 (601) belongs to the group 0 and its rate I2 is 20%. Based on the rate I2 of 20%, the terminal 1 (601) calculates that the range of the available RACH preambles from among the sixty-four RACH preambles is 0 to 12. When attempting a random access, the terminal 1 (601) selects the RACH preamble corresponding to a random number between 0 and 12.

Further, for example, when the access class (AC) of the terminal 2 (602) is 4, the access class bitmap I1 transmitted by the base station 604 is "0000111100", so the terminal 2 (602) recognizes that the terminal 2 (602) belongs to the group 1 and its rate is 40%. Based on the rate I2 of 40%, the terminal 2 (602) calculates that the range of the available RACH preambles from among the sixty-four RACH preambles is 0 to 25. When attempting a random access, the terminal 2 (602) selects the RACH preamble corresponding to a random number between 0 and 25.

Further, for example, when the access class (AC) of the terminal 3 (603) is 8, the access class bitmap I1 transmitted by the base station 604 is "0000000011", so the terminal 3 (603) recognizes that the terminal 3 (603) belongs to the group 2 and its rate is 100%. Based on the rate I2 of 100%, the terminal 3 (603) calculates that the range of the available RACH preambles from among the sixty-four RACH preambles is 0 to 63. When attempting a random access, the terminal 3 (603) selects the RACH preamble corresponding to a random number between 0 and 63.

The range and the number of RACH preambles available for respective groups according to the priority are differently allocated, so the range (0-12) of the RACH preambles usable by the terminals belonging to the group 0, that is, the group with the lowest priority, are shared with other groups, that is, the group 1 and the group 2, so the collision probability is the highest compared to the other groups. Therefore, when the terminal 1 (601) belonging to the group 0 attempts a random access and generates the RACH preamble 1 corresponding to a random number between 0 and 12, it may collide with the RACH preamble 2 generated by the terminal 2 (602) or the RACH preamble 3 generated by the terminal 3 (603).

The range of the available RACH preambles of the terminals belonging to the group 1 that is a group with the intermediate priority includes portions (0-12) shared by the entire groups and portions (13-25) shared by specific groups so the collision probability is intermediate compared to other groups. When the terminal 2 (602) belonging to the group 1 attempts a random access and generates a RACH preamble 2 corresponding to a random number between 0 and 12, it may collide with the RACH preamble 1 of the terminal 1 (601) or the RACH preamble 3 of the terminal 3 (603). On the contrary, when the terminal 2 (602) belonging to the group 1 attempts a random access and generates a RACH preamble 2 corresponding to a random number between 13 and 25, it may collide with the RACH preamble 3 of the terminal 3 (603).

The range of the RACH preambles usable by the terminals belonging to the group 2 that is a group with the highest priority has portions (0-25) shared with the group 1 and the group 2 and portions (26-63) not shared by the same so the collision probability is the lowest compared to the other groups. Therefore, when the terminal 3 (603) belonging to the group 2 attempts a random access and generates the RACH preamble 3 corresponding to a random number between 26 and 63, it may not collide with other groups.

Figure 7:
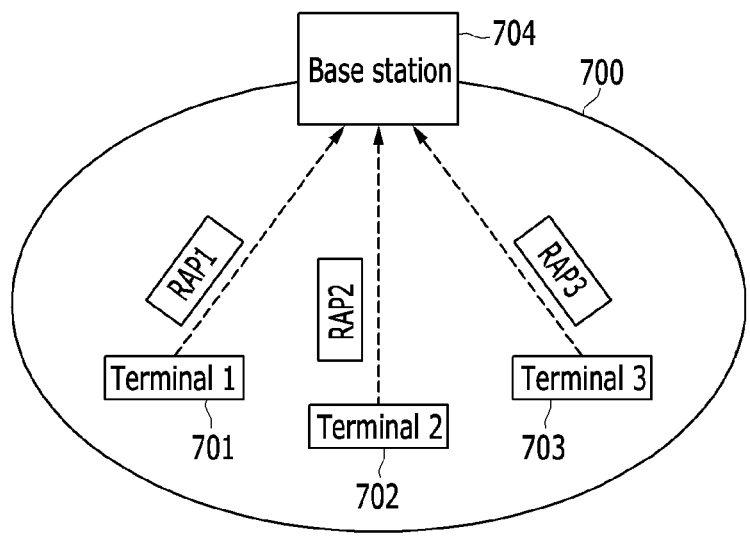
FIG. 7 shows a process for performing a random access according to preamble allocation based on a priority according to a second example of a second exemplary embodiment of the present invention.

FIG. 7 shows a process for performing a random access according to preamble allocation based on a priority according to a second example of a second exemplary embodiment of the present invention. Here, the preambles are allocated using the RACH preamble orthogonal allocation scheme.

As shown in FIG. 7, a terminal 1 (701), a terminal 2 (702), a terminal 3 (703), and a base station 704 may be disposed in a network 700. In the network environment, in a like manner of a first example of a second exemplary embodiment, the terminals 701, 702, and 703 respectively have an access class (AC), and for example, they have one access class between 0 and 9.

The base station 704 uses access class information to group the terminals, and assigns different priorities for respective groups. The base station 704 differently allocates the range and the number of the RACH preambles available for respective groups according to the priorities, and here, a size of the range of the RACH preambles allocated to the groups becomes different according to the priority. For example, the base station 704 allocates a wider RACH preamble range as the priority becomes higher, and it allocates a narrower RACH preamble range as the priority becomes lower.

The base station 704 notifies the terminals 701, 702, and 703 of the network 700 of corresponding group and priority related information. The group and priority related information of the terminals 701, 702, and 703 includes an access class bitmap I1, a range I21, and a group I3.

The access class bitmap I1 has a same configuration as the above-described exemplary embodiment, and a detailed description thereof will be omitted.

The range I21 indicates an available range of the RACH preamble when the terminal attempts a random access. The range I21 may be configured in a form of (a start RACH preamble, a final RACH preamble) according to the range of RACH preambles usable from the entire RACH preambles. For example, the range I21 has a value of 0 to 63, and it may be expressed as (00, 15).

For example, when the range I21 is (00, 15), it signifies that the RACH preambles may be generated within the range of 0 to 15 in the entire range of 0 to 63. Further, when the range I21 is (16, 40), it signifies that the RACH preambles may be generated within the range of 16 to 40 in the entire range of 0 to 63. Further, when the range I21 is (41, 63), it signifies that the RACH preambles may be generated within the range of 41 to 63 in the entire range of 0 to 63.

The range I21 may be configured in a form of (a start RACH preamble, a RACH preamble length). For example, when the range I21 is (12, 12), it signifies that the RACH preambles may be generated within the range of 12 to 23 in the entire range of 0 to 63.

The group I3 indicates a group according to the access class.

The group and priority related information including the access class bitmap I1, the range I21, and the group I3 may be broadcast using an SIB.

The terminals 701, 702, and 703 in the network 700 have one access class (AC), so they may know the group to which they belong and the range and the number of available RACH preambles allocated to the group based on the group and priority related information provided by the base station 704. That is, they may know information on the range I21 of the group to which they belong from the information provided through the SIB.

For example, as shown in FIG. 7, when the access class (AC) of the terminal 1 (701) is 3, the access class bitmap I1 transmitted by the base station 704 is "1111000000", so the terminal 1 (701) recognizes that the terminal 1 (701) belongs to the group 0 and the range I21 of its available RACH preambles is 0 to 12. When attempting a random access, the terminal 1 (701) selects the RACH preamble corresponding to a random number between 0 and 12. Further, when the access class (AC) of the terminal 2 (702) is 4, the access class bitmap I1 transmitted by the base station 704 is "0000111100", so the terminal 2 (702) recognizes that the terminal 2 (702) belongs to the group 1 and the range I21 of its available RACH preambles is 13 to 27. When attempting a random access, the terminal 2 (702) selects a RACH preamble corresponding to a random number between 13 and 27. Further, when the access class (AC) of the terminal 3 (703) is 8, the access class bitmap I1 transmitted by the base station 704 is "0000000011", so the terminal 3 (703) recognizes that the terminal 3 (703) belongs to the group 2 and the range I21 of its available RACH preambles is 28 to 63. When attempting a random access, the terminal 3 (703) selects a RACH preamble corresponding to a random number between 28 and 63.

A range size of the RACH preambles allocated to the groups become different according to the priority, and the terminals belonging to the group 0 that is the group with the lowest priority have the range of available RACH preambles from 0 to 12 so they may generate thirteen preambles. The terminals belonging to the group 1, that is, a group with an intermediate priority, have the range of available RACH preambles is 13 to 27 so they may generate fifteen preambles. The terminals belonging to the group 2, that is, a group with the highest priority, have the range of available RACH preambles is 28 to 63 so they may generate thirty-six preambles. The ranges of preambles allocated to the respective groups are different and the preambles are orthogonal to each other so when a random access is attempted no collisions are generated with other groups.

When the terminal selects one RACH preamble from the range of available RACH preambles, it may generate a random number and may select a RACH preamble of the number corresponding to the random number generated within the range of available RACH preambles. For example, when the random number generated by the terminal 1 (701) is 2, the terminal 1 (701) may select the RACH preamble corresponding to 2 from the range (0-12) of available RACH preambles.

For this purpose, the terminal may use an additional pseudo-random number generator. Further, a minimum value and a maximum value may be set for the random number. For example, the minimum value of the range of available RACH preambles may be applied with the minimum value of the random number generated by the pseudo-random number generator, and the maximum value of the range of available RACH preambles may be applied with the maximum value of the random number. Therefore, the random number generated by the pseudo-random number generator may be a random value between 0 and 63.

Figure 8:
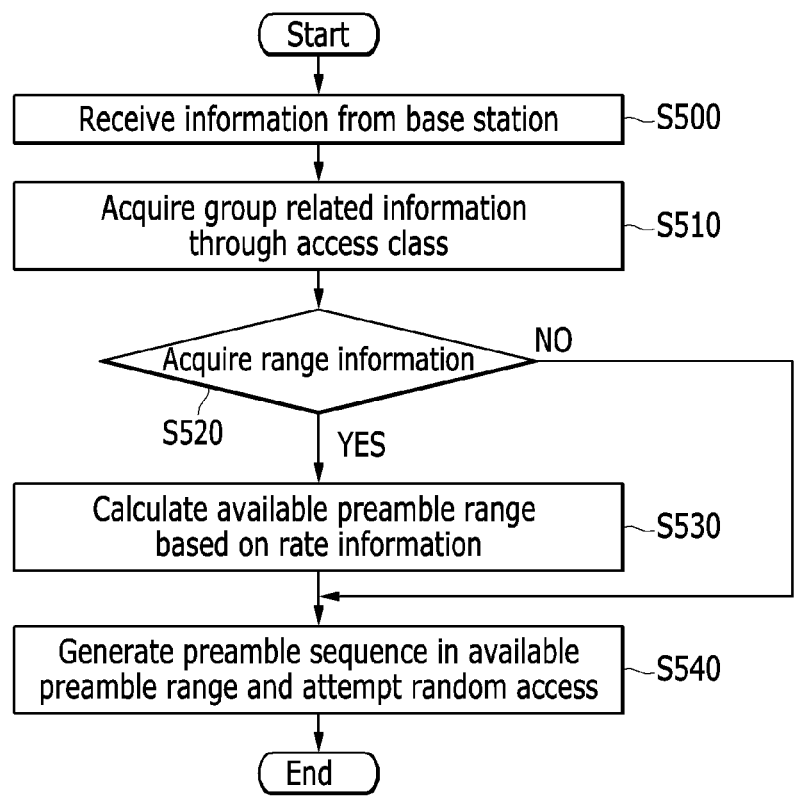
FIG. 8 shows a flowchart of a random access method according to a second exemplary embodiment of the present invention.

FIG. 8 shows a flowchart of a random access method according to a second exemplary embodiment of the present invention.

As shown in FIG. 8, a terminal acquires group and priority related information from a base station. For example, the terminal receives SIB information broadcast by the base station, compares an access class bitmap I1 included in the SIB information and an access class of the terminal to check a group I3 to which the terminal belongs, and acquires a rate I2 or a range I21, that is, priority related information assigned to the corresponding group I3 (S500) and (S510).

When acquiring the rate I2 from the SIB information, the terminal uses information on the rate I2 to calculate a range of RACH preambles available when a random access is attempted (S520) and (S530). As described, the terminal calculates the range of RACH preamble available from among the entire number of (e.g., sixty-four) RACH preambles based on the rate I2.

The terminal generates a preamble sequence within the range of available RACH preambles and attempts a random access to the base station (S540). That is, the terminal generates one random number within the range of available RACH preambles, selects one RACH preamble corresponding to the random number, and attempts a random access by using the selected RACH preamble.

When the terminal acquires the range I21 from the SIB information in the stage S520, the terminal may know the range of available RACH preambles without an additional calculation by using information of the range I21, generate a preamble sequence within the range of available RACH preambles, and attempt a random access to the base station (S540).

In the above-described second exemplary embodiment of the present invention, the terminal receives the SIB broadcast by the base station, acquires group and priority related information, and performs a random access. However, the terminal may acquire the group and priority related information through following methods in addition to the SIB broadcast by the base station.

Method 1: a method for acquiring or setting group and priority related information in the case of registration of a terminal, Method 2: a method for acquiring or setting group and priority related information in the case of installation of a terminal, and Method 3: a method for acquiring or setting group and priority related information in the case of release of connection of a terminal.

Here, the method 1 represents a method for presetting an initial value in a terminal when the terminal is registered. The method 2 represents a method for setting an initial value in a terminal when the terminal is installed. The initial value of the terminal is variable according to an application type (or output power) applied at the installation time. The method 3 represents a method for acquiring an initial value to be used when a terminal is connected to the base station again when a connection of the terminal is released. The initial value is changeable depending on the application applied to the terminal or a state of the network.

The initial value of the terminal may include group information, access class information, rate information, and range information.

Priorities may be assigned to the above-described methods (a setting at the time of registration, a setting at the time of installation, and a setting at the time of releasing a connection) for setting group and priority related information with an initial value, and the initial value may be set by using the corresponding method according to the priority. Further, the priorities applicable to the respective methods are modifiable and they may be operable by selective combination methods.

A random access method according to a third exemplary embodiment of the present invention will now be described.

When a random access load increases to reach a congested state in the mobile communication network, a method called an access class barring (ACB) may be used. It represents a method for controlling a random access of a terminal according to an access class (AC) to which the terminal belongs. For example, the access class (AC) may be classified into sixteen ACs. The terminals have one AC between the AC 0 and the AC 9. The terminals may additionally have a special class between the AC 10 and the AC 15.

The base station uses the system information block (SIB) to transmit detailed parameters relating to the access class barring (ACB). The detailed parameters include an access barring factor (ac-BarringFactor) and an access barring time (ac-BarringTime).

The access barring factor (ac-BarringFactor) is a random number between 0 and 1 for determining whether to bar the random access in the case of network congestion. The access barring factor may be a value of p00 to p95, and it is analyzed that p00=0, p05=0.05, p10=0.10, . . . , and p95=0.95. The terminal accessing the mobile communication network generates a random number, it attempts a random access when the value of the random number is less than the value of the access barring factor, and it abandons the attempt of a random access when the value of the random number is greater than the value of the access barring factor.

The access barring time (ac-BarringTime) represents a mean time for the random access barred by the access class barring (ACB) to stand by until it attempts an access. The value of the access barring time may exemplarily be s4, s8, s16, s32, s64, s128, s256, and s512, and here it is analyzed that s4=4 seconds, s8=8 seconds, . . . , and s512=512 seconds.

Transmission efficiency of the random access may be improved by the access class barring (ACB) in the case of network congestion, and when the congested states becomes serious, an access delay time increases because of the very small value of the access barring factor.

In a third exemplary embodiment of the present invention, access class barring (ACB) information is used to dynamically control a random access of a terminal (particularly, an M2M device), and the access class barring (ACB) is used to dynamically allocate the RACH preamble of the terminal.

Figure 9:
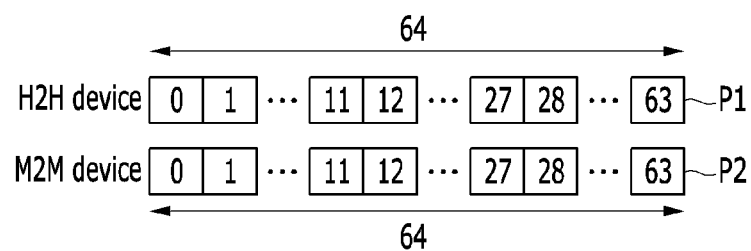
FIG. 9 shows a process for performing a random access according to a first example of a third exemplary embodiment of the present invention.
Figure 9:
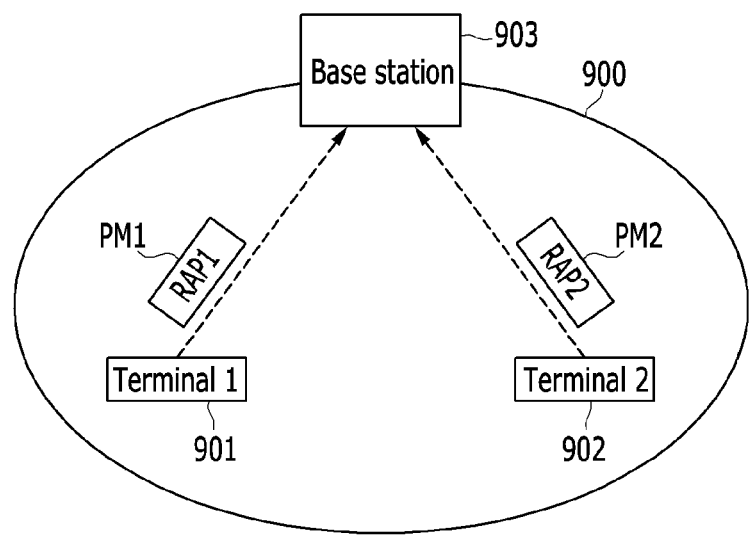

FIG. 9 shows a process for performing a random access according to a first example of a third exemplary embodiment of the present invention.

As shown in FIG. 9, a terminal 1 (901), a terminal 2 (902), and a base station 903 may be disposed in a network 900. In the network environment, the terminals 901 and 902 respectively have an access class (AC), and for example, they have one of the access classes 0 to 9. Here, it will be assumed that the terminal 1 (901) belongs to a human-to-human (H2H) device, and the terminal 2 (902) belongs to a machine-to-machine (M2M) device.

When the network 900 is not congested, the terminal 1 (901) belonging to the H2H device may exemplarily use up to sixty-four RACH preambles P1. The terminal 1 (901) attempting a random access randomly selects one of the sixty-four RACH preambles P1, and transmits a random access preamble 1 (PM1) message to the base station 903.

When the network 900 is not congested, the terminal 2 (902) belonging to the M2M device may exemplarily use up to sixty-four RACH preambles P2. The terminal 2 (902) attempting a random access randomly selects one of the sixty-four RACH preambles P2 and transmits a random access preamble 2 (PM2) message to the base station 903.

In a second example of a third exemplary embodiment of the present invention, a dynamic preamble allocation is performed in a network congested state.

Figure 10:
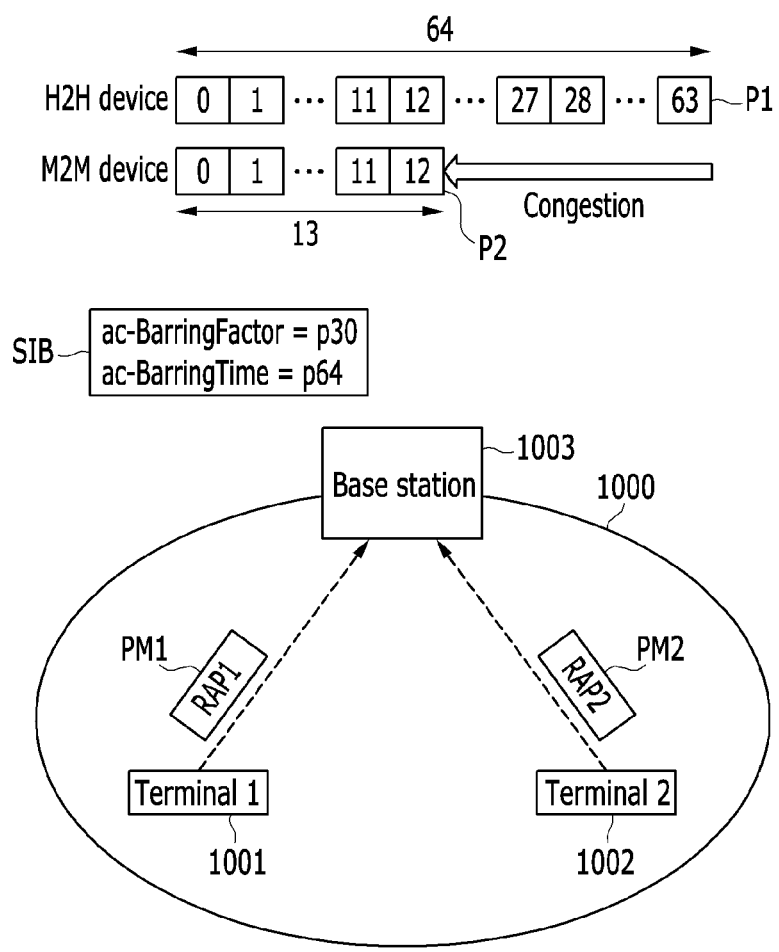
FIG. 10 shows a process for performing a random access according to dynamic preamble allocation according to a second example of a third exemplary embodiment of the present invention.

FIG. 10 shows a process for performing a random access according to dynamic preamble allocation according to a second example of a third exemplary embodiment of the present invention.

As shown in FIG. 10, it will be assumed that a terminal 1 (1001), a terminal 2 (1002), and a base station 1003 are disposed in a network 1000, the terminals 1001 and 1002 respectively have one of the access classes exemplarily between 0 and 9, the terminal 1001 belongs to the H2H device, and the terminal 2 (1002) belongs to the M2M device.

In the network environment, when the network is congested, the base station 1003 performs the access class barring (ACB) method so as to solve the network congestion. For this purpose, the base station 1003 uses system information block (SIB) to broadcast access class barring related information including an access barring factor (ac-BarringFactor) and an access barring time (ac-BarringTime) to the terminals.

When the network 1000 is congested, the terminal 1 (1001) belonging to the H2H device may randomly select one of up to sixty-four RACH preambles P1, and may transmit a random access preamble 1 (PM1) message to the base station 1003.

However, when the network 1000 is congested, the number of RACH preambles P2 usable by the terminal 2 (1002) belonging to the M2M device is reduced. The range of the available RACH preambles P2 of the terminal 2 (1002) depends on the access barring factor (ac-Barring Factor) transmitted through the system information block (SIB) and determining whether to bar the access. For example, when the access barring factor (ac-BarringFactor) transmitted by the base station 1003 is p30, thirteen RACH preambles 0 to 12, which are 30% of the sixty-four RACH preambles, are calculated to be available.

In an exemplary embodiment of the present invention, in order to dynamically control the random access of the terminals belonging to the M2M device when the network is congested, the RACH preambles are dynamically allocated to the terminals belonging to the M2M device by using the random number.

For this purpose, the terminal 2 (1002) belonging to the M2M device uses a pseudo-random number generator to generate a random number. A minimum value and a maximum value may be set for the random number. For example, the minimum value of the entire range of RACH preambles may be applied as the minimum value of the random number generated by the pseudo-random number generator, and the maximum value of the entire range of RACH preambles may be applied as the maximum value of the random number. Therefore, the random number generated by the pseudo-random number generator may be a random value between 0 and 63.

The terminal 2 (1002) generates a random number, compares the generated random number and an allowable range of available RACH preambles calculated based on the access barring factor (ac-BarringFactor), and determines whether to perform a random access.

For example, when the generated random number is 21, it exceeds the allowable range (0 to 12) of available RACH preambles calculated based on the access barring factor (ac-BarringFactor) so the terminal 2 (1002) does not attempt a random access by applying the access class barring (ACB) but again attempts the random access after the access barring time (ac-BarringTime). Accordingly, the same effect as the general access class barring (ACB) method may be provided. When the generated random number is 11, it does not exceed the allowable range (0 to 12) of available RACH preambles calculated based on the access barring factor (ac-BarringFactor), so the terminal 2 (1002) uses the RACH preamble corresponding to the random number to generate a random access preamble 2 (PM2) message and transmit the same to the base station 1003.

Here, while the range of available RACH preambles of the H2H device is 0 to 63, the range of available RACH preambles of the M2M device is 0 to 12, and an available area may be restricted.

According to a second example of a third exemplary embodiment of the present invention, when the network is congested, the terminals belonging to the H2H device using the RACH preambles of 13 to 63 do not collide with the terminals belonging to the M2M device so they may have a high access success probability.

Figure 11:
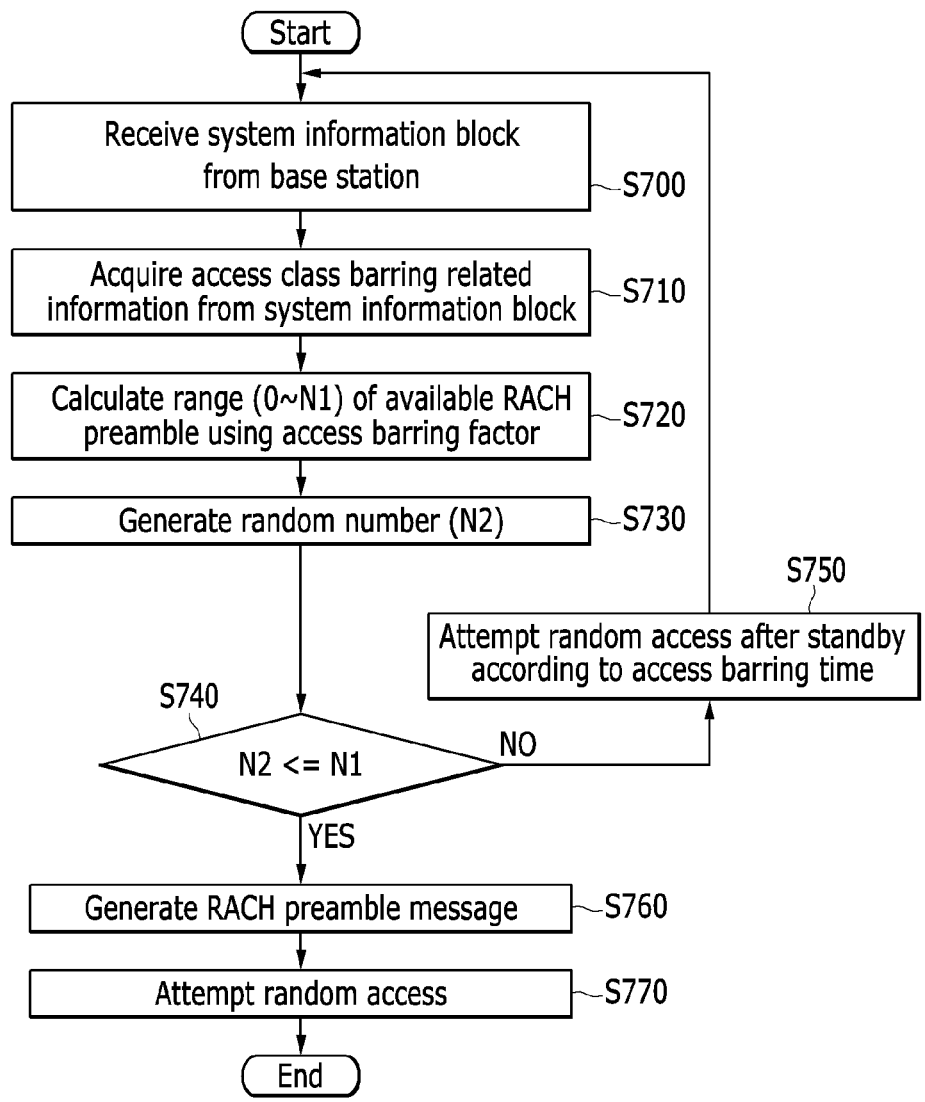
FIG. 11 shows a flowchart of a random access method according to a third exemplary embodiment of the present invention.

FIG. 11 shows a flowchart of a random access method according to a third exemplary embodiment of the present invention.

As shown in FIG. 10, a terminal to which access class barring (ACB) is applied receives a system information block (SIB) broadcast by the base station (S700). The terminal acquires access class barring related information corresponding to the access class of the terminal included in the received system information block (SIB). The access class barring related information includes an access barring factor (ac-BarringFactor) and an access barring time (ac-BarringTime) (S710).

The terminal uses the access barring factor (ac-BarringFactor) to calculate the range (0 to N1 where N is an integer) of the RACH preambles usable by the terminal (S720). The terminal generates a random number (N2 which is a random value exemplarily between 0 and 63) for the RACH preamble (S730).

The terminal compares the range of the RACH preambles calculated using the access barring factor (ac-BarringFactor) and the generated random number N2 (S740). According to a comparison result, when the generated random number N2 is not included in the range of the RACH preambles calculated using the access barring factor (ac-BarringFactor), the terminal uses the access barring time (ac-BarringTime) to attempt a random access after a predetermined standby (S750). On the contrary, when the generated random number N2 is included in the range of the RACH preambles calculated using the access barring factor (ac-BarringFactor), the terminal selects the RACH preamble corresponding to the generated random number N2, generates a random access preamble message based on the selected RACH preamble, and attempts a random access (S760).

Figure 12:
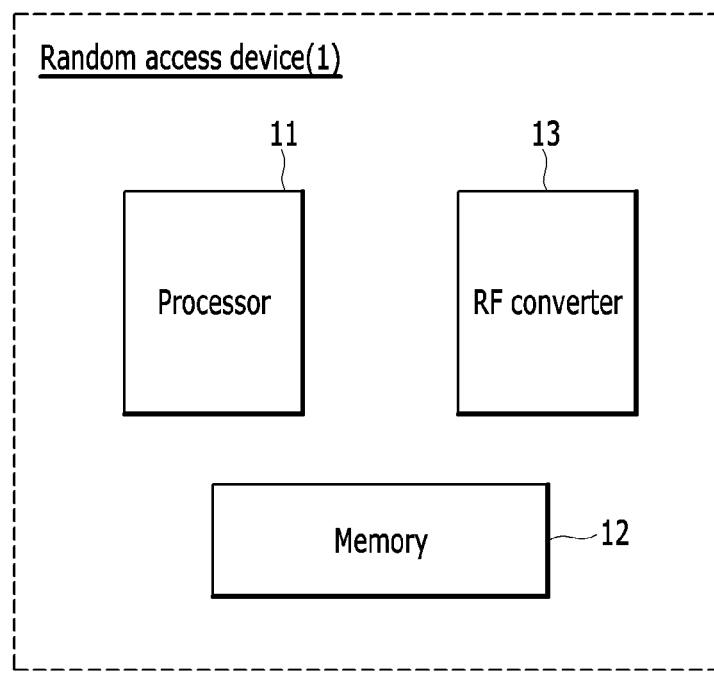
FIG. 12 shows a configuration diagram of a random access device according to an exemplary embodiment of the present invention.

FIG. 12 shows a configuration diagram of a random access device according to an exemplary embodiment of the present invention.

As shown in FIG. 12, the random access device 1 includes a processor 11, a memory 12, and a radio frequency (RF) converter 13. The processor 11 may be configured to realize the methods that are described with reference to FIG. 1 to FIG. 11.

The memory 12 is connected to the processor 11 and stores various kinds of information relating to an operation of the processor 11. The RF converter 13 is connected to the processor 11 and transmits/receives radio signals.

According to the exemplary embodiments of the present invention, timings for a plurality of terminals to attempt an access are different from each other to prevent the collision generated by the overload in the case of a random access.

Further, the respective terminals generate a random number with a unique value and a uniform distribution according to the access time distributing scheme, thereby modifying the access of terminals to the uniform distribution from the burst distribution and reducing the collision.

Further, the access of terminals is divided into 1,024 system frame number (SFN) time intervals to induce the access and reduce the collision probability, and it is simultaneously possible to divide the terminals in the network into 1,024 groups and control the same. In addition, the collision probability may be further reduced by additionally dividing the access of terminals into ten sfn time intervals and inducing the access.

Access class information is used to group the terminals, and the range and the number of RACH preambles usable for respective groups are differently allocated to efficiently provide the quality of service (QoS) for respective groups when a plurality of terminals simultaneously attempt an access.

The respective terminals use priority information to attempt a random access so the terminal with a high priority has the merit of having a high QoS, a high success probability, and a low delay time.

Further, it is possible to set different numbers of preambles among the groups by using the RACH preamble orthogonal allocation scheme, and prevent the collision of the preambles among the groups in advance. Further, it is possible to set different numbers of preambles among the groups by using the RACH preamble sharing allocation scheme, and provide a low collision probability to the group with a high priority.

Further, the random access of the terminal is dynamically controlled by using access class barring information, and the RACH preamble of the terminal is dynamically allocated by using the access class barring information.

Further, it is possible to bar the random access of the terminals of a special class by using the access class barring information. Further, it is possible, through dynamic RACH preamble allocation, to provide a high random access success probability to the H2H devices by controlling the RACH preambles applicable to the M2M devices.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A random access method of a terminal in a mobile communication system, comprising:

setting information uniquely allocated to the terminal as a seed value;

generating a random number for a random access by using the seed value;

comparing the random number and a setting value; and transmitting a preamble for a random access to a base station when the random number is included in the setting value, wherein the setting of the seed value includes:
setting the seed value based on one of a first method for setting a seed value when a terminal is registered, a second method for setting a seed value when a terminal is installed, and a third method for setting a seed value when a connection of a terminal is released; and
assigning priorities to the first method, the second method, and the third method, and setting the seed value based on the corresponding method according to the priorities.

2. The random access method of claim 1, wherein
the setting value is frame information transmitted from the base station,
the comparing includes
comparing frame information transmitted from the base station and the generated random number, and
the transmitting of a preamble to the base station includes
transmitting a preamble for a random access to the base station when the frame information corresponds to the random number.

3. The random access method of claim 1, wherein
the seed value includes one of
an international mobile subscriber identity (IMSI) allocated to a terminal,
an international mobile equipment identity (IMEI) allocated to a terminal, and
a mobile subscriber identification number (MSIN) allocated to a terminal, and
the frame information is a system frame number (SFN).

4. The random access method of claim 1, wherein
the generating of a random number includes
generating a first random number for a random access by using the seed value, and
generating a second random number for a random access by using the seed value,
the comparing of frame information and the generated random number includes
comparing first frame information transmitted by the base station and the first random number, and
comparing second frame information transmitted by the base station and the second random number when the first frame information corresponds to the first random number, and
a preamble for a random access is transmitted to the base station when the second frame information corresponds to the second random number.

5. The random access method of claim 4, wherein
the first frame information is a system frame number (SFN 1), and the second frame information is a sub-frame number (sfn 2),
the first random number is a random value included in a first range, the second random number is a random value included in a second range, and the first range is different from the second range, and
a minimum value and a maximum value of the first range correspond to a minimum value and a maximum value of the SFN 1, respectively, and a minimum value and a maximum value of the second range correspond to a minimum value and a maximum value of the sfn 2, respectively.

6. The random access method of claim 1, wherein
the setting value is a range of available random access channel (RACH) preambles, and
the method further includes allowing the terminal to receive information broadcast by the base station and determining an access barring factor for determining whether to bar an access, and calculating a range of the available RACH preambles by using the access barring factor.

7. The random access method of claim 6, wherein
the generating of a random number includes
generating a random number for the RACH preamble,
the comparing includes
comparing to determine whether the random number is included in the range of available RACH preambles, and
the transmitting of a preamble to the base station includes
transmitting a preamble for a random access to the base station when the random number is included in the range of available RACH preambles.

8. The random access method of claim 7, wherein
the acquiring of an access barring factor further includes
allowing the terminal to receive information broadcast by the base station and acquire an access barring time, and
the transmitting of a preamble to the base station further includes
performing a standby based on the access barring time when the random number is not included in the range of available RACH preambles, and transmitting a preamble for a random access to the base station.

9. The random access method of claim 6, wherein
the terminal belongs to one access class, a value of the access barring factor is changed for each access class, and
a number of preambles belonging to the range of available RACH preambles becomes different according to a value of the access barring factor.

10. A random access method of a terminal in a mobile communication system, comprising:
generating a random number for a random access by setting and using a seed value;
comparing the random number and a setting value; and
transmitting a preamble for a random access to a base station when the random number is included in the setting value,
wherein the setting of the seed value includes:
setting the seed value based on one of a first method for setting a seed value when a terminal is registered, a second method for setting a seed value when a terminal is installed, and a third method for setting a seed value when a connection of a terminal is released; and
assigning priorities to the first method, the second method, and the third method, and setting the seed value based on the corresponding method according to the priorities.

11. The random access method of claim 10, the method further comprising:
generating a first random number for a random access;
generating a second random number for a random access;
comparing a system frame number (SFN 1) transmitted by a base station and the first random number, and
comparing a sub-frame number (sfn 2) transmitted by the base station and the second random number when the SFN 1 corresponds to the first random number, and
transmitting a preamble for a random access to the base station when the sfn 2 corresponds to the second random number.

12. The random access method of claim 11, wherein the first random number is a random value included in a first range, the second random number is a random value included in a second range, and the first range is different from the second range, and a minimum value and a maximum value of the first range correspond to a minimum value and a maximum value of the SFN 1, respectively, and a minimum value and a maximum value of the second range correspond to a minimum value and a maximum value of the sfn 2, respectively.

13. A random access device in a mobile communication system, comprising:
   a radio frequency (RF) converter for transmitting/receiving signals through an antenna; and
   a processor connected to the RF converter and performing a random access,
   wherein the processor is configured to set information uniquely allocated to the terminal as a seed value, generate a random number for a random access by using the seed value, compare the random number and a setting value, and transmit a preamble for a random access to the base station when the random number is included in the setting value,
   wherein the setting of the seed value includes:
   setting the seed value based on one of a first method for setting a seed value when a terminal is registered, a second method for setting a seed value when a terminal is installed, and a third method for setting a seed value when a connection of a terminal is released; and
   assigning priorities to the first method, the second method, and the third method, and setting the seed value based on the corresponding method according to the priorities.

14. The random access device of claim 13, wherein
   the setting value represents frame information transmitted from the base station, and
   the processor is configured to transmit a preamble for a random access to the base station when the frame information corresponds to the random number.

15. The random access device of claim 14, wherein
   the processor is configured to generate a first random number for a random access, generate a second random number for a random access, compare second frame information transmitted by the base station and the second random number when first frame information transmitted by the base station corresponds to the first random number 1, and transmit a preamble for a random access to the base station when the second frame information corresponds to the second random number.

16. The random access device of claim 13, wherein
   the setting value represents a range of available random access channel (RACH) preambles acquired by receiving information broadcast from the base station by the terminal, and calculated based on an access barring factor for determining whether to bar an access, and
   the processor is configured to generate a random number for RACH preambles, and transmit a preamble for a random access to the base station when the random number is included in the range of available RACH preambles.

17. The random access device of claim 16, wherein
   the processor is configured to additionally allow the terminal to receive information broadcast by the base station to acquire an access barring time, perform a standby based on the access barring time when the random number is not included in the range of available RACH preambles, and transmit a preamble for a random access to the base station.

18. The random access device of claim 13, wherein the first frame information is a system frame number (SFN 1), and the second frame information is a sub-frame number (sfn 2),
   the first random number is a random value included in a first range, the second random number is a random value included in a second range, and the first range is different from the second range, and
   a minimum value and a maximum value of the first range correspond to a minimum value and a maximum value of the SFN 1, respectively, and a minimum value and a maximum value of the second range correspond to a minimum value and a maximum value of the sfn 2, respectively.

19. The random access device of claim 13, wherein the seed value is set based on one of a first method for setting a seed value when a terminal is registered, a second method for setting a seed value when a terminal is installed, and a third method for setting a seed value when a connection of a terminal is released, and
   wherein a priority is allocated to the first method, the second method, and the third method, respectively, and the seed value is set based on the corresponding method according to the priority.

* * * * *